Dec. 19, 1967  K. S. R. HULTGREN ET AL  3,358,786

STEERING DEVICE FOR A TRACK-LAYING VEHICLE

Filed Oct. 15, 1965  3 Sheets-Sheet 1

INVENTORS
KARL STEN RUDOLF HULTGREN
LARS GUSTAV ROBERT ENGBERG
BY
ATTORNEYS

Dec. 19, 1967  K. S. R. HULTGREN ET AL  3,358,786
STEERING DEVICE FOR A TRACK-LAYING VEHICLE
Filed Oct. 15, 1965  3 Sheets-Sheet 2

INVENTORS
KARL STEN RUDOLF HULTGREN
LARS GUSTAV ROBERT ENGBERG
BY
Hanes and Nydick
ATTORNEYS Dec. 19, 1967  K. S. R. HULTGREN ET AL  3,358,786
STEERING DEVICE FOR A TRACK-LAYING VEHICLE
Filed Oct. 15, 1965  3 Sheets-Sheet 3

INVENTORS
KARL STEN RUDOLF HULTGREN
LARS GUSTAV ROBERT ENGBERG
BY
ATTORNEYS

United States Patent Office 3,358,786
Patented Dec. 19, 1967

3,358,786
STEERING DEVICE FOR A TRACK-LAYING VEHICLE
Karl Sten Rudolf Hultgren, Bofors, and Lars Gustav Robert Engberg, Karlskoga, Sweden, assignors to Aktiebolaget Bofors, Bofors, Sweden, a corporation of Sweden
Filed Oct. 15, 1965, Ser. No. 496,498
Claims priority, application Sweden, Oct. 28, 1964, 13,007/64
3 Claims. (Cl. 180—6.7)

ABSTRACT OF THE DISCLOSURE

A track-laying vehicle in which the brakes may be used either for braking the speed of the vehicle or for turning the vehicle. For the purpose of reducing the speed of the vehicle, both brakes are simultaneously applied, and for the purpose of steering only one brake is applied. One servo system is provided for each brake and the two servo systems can be independently controlled to activate only one brake or both brakes.

---

The present invention relates to a device for steering systems of track-laying vehicles, particularly to steering systems in which two brakes comprised in the steering system are capable of functioning as steering brakes and also as driving brakes. The steering brake function involves that when steering the track-laying vehicle, only the brake for the track on the side of the vehicle facing the direction in which it is intended to turn the vehicle is actuated. When the brakes are used as driving brakes, the brakes for both tracks are operated to function simultaneously to give the vehicle the same braking effect as with conventional braking of the vehicle.

In systems as hitherto used, in which the brakes comprised in the steering system have been utilized for both steering braking and driving braking, two separate hydraulic pistons have been arrranged for each brake, one intended to function for steering braking and one for driving braking. This has involved considerable disadvantages.

The present invention has for an object to provide a device which allows the two brakes comprised in the steering system to be served by only one hydraulic piston each, which can function for both steering braking and driving braking.

The device for steering systems for track-laying vehicles in which two brakes are comprised in the steering system and are capable of functioning as steering brakes and also as driving brakes is characterized according to the present invention in that a hydraulic piston arranged at each brake for regulating the brake is connected with a valve which can receive pressure impulses for both steering braking and driving braking and is arranged in such a way that it allows the strongest of these impulses to pass through to the hydraulic piston. The valve connected to the hydraulic piston of the brake can appropriately comprise a valve body which is arranged so that it can be displaced in a valve housing, and is surrounded by three chambers, of which the middle one is connected with the corresponding hydraulic piston and the two outer ones can receive pressure impulses for steering braking and for driving braking. The valve body is arranged in such a way that, depending upon its position, it will provide an open connection between the middle chamber and one of the two outer chambers. The valve body is provided with recesses which connect each of the two outer chambers with the corresponding adjacent outer end of the valve body. A valve may be arranged in a pipe for transmitting pressure impulses for driving braking. The valve, when the driving brake pedal is not actuated, allows said pipe to be in connection with the outlet side of the hydraulic system belonging to the device, but when said driving brake pedal is actuated, allows oil under pressure to flow from the pressure side of the hydraulic system with a pressure corresponding to the actuation of the driving brake pedal.

The invention will now be described more in detail, with reference to an embodiment of the invention shown in the accompanying drawing.

Figures 1, 2:
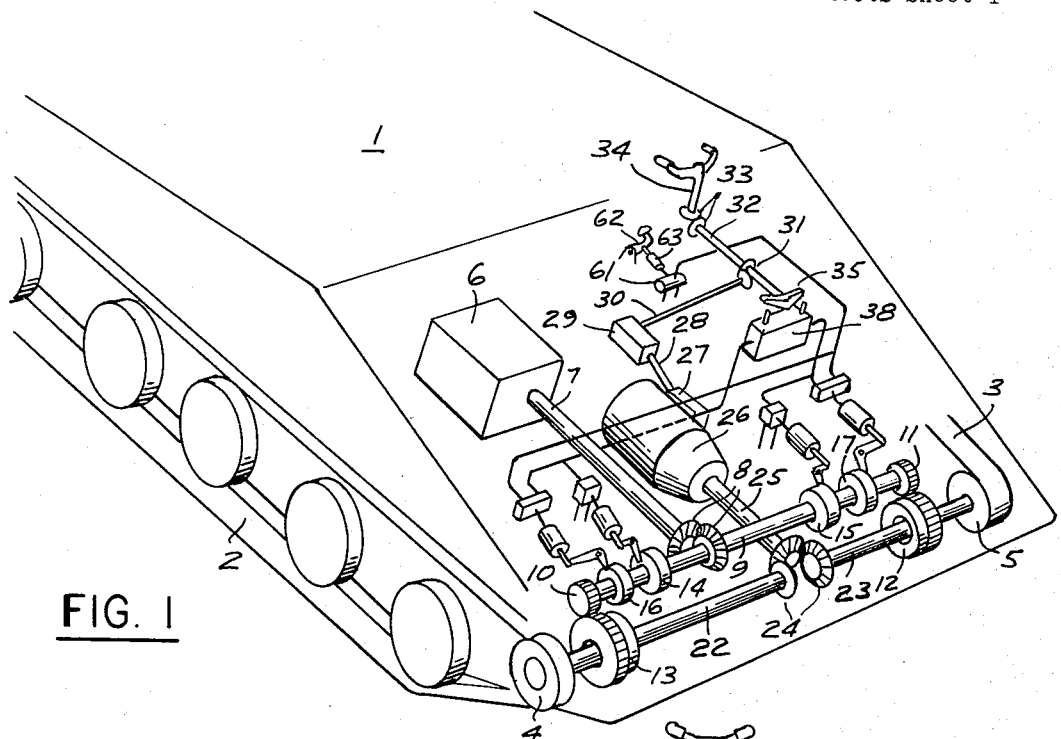
FIG. 1 shows, in perspective and schematically, a track-laying vehicle with a steering system including a device according to the present invention.
FIG. 2 shows a plane diagram of this steering system.
Figure 5:
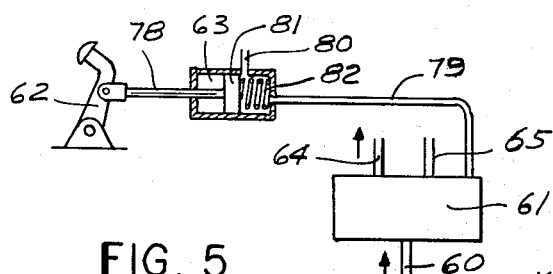
FIG. 5 shows how the driving brake pedal belonging to the system has been connected.

Describing now the figures in detail, the track-laying vehicle shown in FIG. 1 is provided with a steering system which, in general, corresponds to the steering system described in pending application Ser. No. 484,248 filed Sept. 1, 1965, and to the extent they are applicable the same reference numerals are used. Clutches 14 and 15 are provided to disengage gears 10 and 11 from drive shaft 9. The clutches are controlled by valves 43 and 45 respectively, connected via valves 51 and 52 respectively, and pipes 53 and 54 respectively, to a control valve 38, as fully described in application Ser. No. 484,248. In contradistinction to the steering device described in the aforesaid patent application, the steering device according to the present invention comprises only one hydraulic servo piston-cylinder unit (44 and 46, respectively) for each of steering brakes 16 and 17. In the connections for the two hydraulic units 44 and 46 of the brakes 16 and 17, respectively, valves 55 and 56 are arranged which are connected with the corresponding hydraulic units by pipes 58 and 59. Valves 55 and 56 are further connected to pipes 41 and 42 leading to a control unit valve 38, and also to a pipe 60 and its branch pipe 60A. The pipe 60 is connected with a valve 61 which in turn, via a pipe 79, is connected with a hydraulic piston-cylinder unit 63. The valve 61 is also connected by pipes 64 and 65 to the outlet and pressure sides, respectively, of the hydraulic supply system belonging to the steering system. The unit 63 may be fed with oil (at normal pressure) via a pipe 80, and a piston 81 (see FIG. 5) in the cylinder of unit 63 may be actuated by a driving brake pedal 62 via a link 78.

Figure 3:
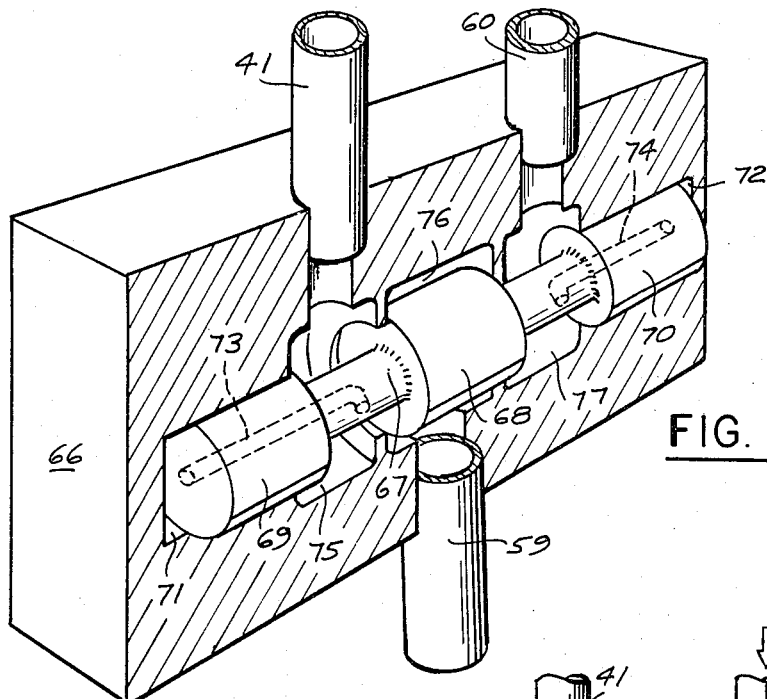
FIG. 3 shows a valve comprised in the steering system, in perspective and partly cut away, in the position when there has not been any impulse for either steering braking or driving braking.
Figure 4:
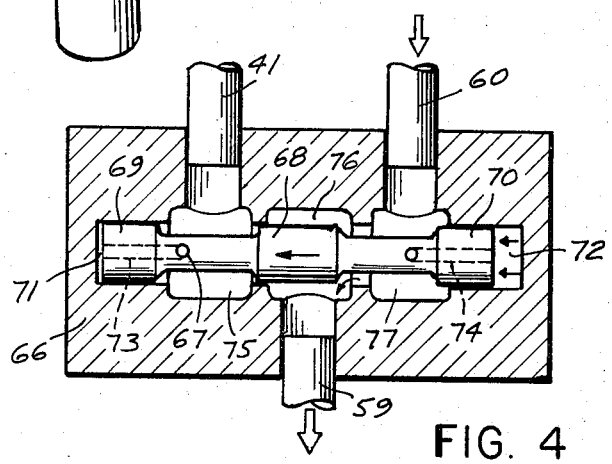
FIG. 4 shows a cross section of the valve shown in FIG. 3, in a position corresponding to when the valve has received a pressure impulse for driving braking.

The construction of valve 55 is shown in more detail in FIGS. 3 and 4. A valve member 67 is arranged so that it can be displaced in a valve housing 66. The valve member 67 is displaceable in three chambers 75, 76 and 77. It is formed with three large cylindrical collars 68, 69 and 70, which are located in such a way that the spaces between these collars will lie between the two outer chambers 75 and 77. These two outer chambers 75 and 77 are connected via pipes 41 and 60 to the control unit valve 38 and the driving brake valve 61, respectively, and the middle chamber 76 is connected via pipe 59 with the hydraulic unit 44 of the brake. The valve member 67 also includes two recesses 73 and 74 which connect the chambers 75 and 77 with the chambers 71 and 72 located outside the respective outer ends of the valve member 67.

The mechanism of the system with which a driving braking function is obtained is shown in more detail in FIGS. 5, 6, 7 and 8. As previously mentioned, the driving brake pedal 62 is connected via link 78 with piston 81, which is arranged so that it can be displaced in the cylinder of unit 63. This piston 81 is actuated by means of a spring 82 in a direction opposite to the direction in which the link 78 can be pressed in. A pipe 79 connects the part of the cylinder opposite the link 78 with the valve 61.

Figure 6:
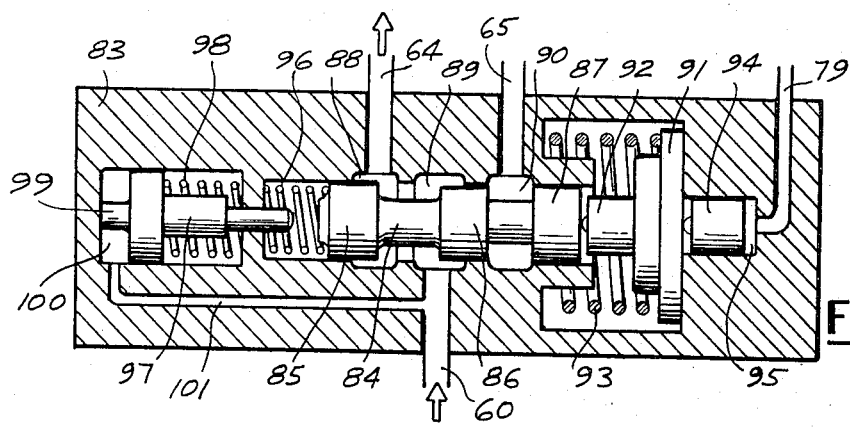
FIG. 6 shows a cross section of the valve placed in the pipe for the driving braking impulse, FIGS. 5 and 6 both illustrating the positions when the driving brake pedal has not been actuated.
Figure 8:
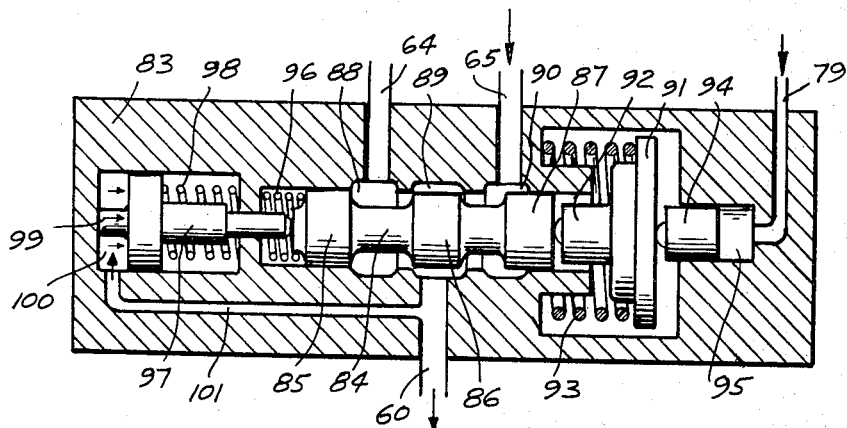
FIG. 8 is similar to FIG. 6, but shows the position when a driving braking impulse has been transmitted to the respective valve.

The structure of valve 61 is shown in FIGS. 6 and 8. In a valve housing 83 a valve member 84 is displaceably arranged. This valve member 84 is provided with three large cylindrical collars 85, 86 and 87, and is surrounded by three circular chambers 88, 89 and 90. The middle chamber 89 is connected via pipe 60 with the valve 55, and the two outer chambers 88 and 90 are connected via the pipes 64 and 65 with the outlet and the pressure sides, respectively, of the hydraulic supply system. The valve member 84 may be displaced by a ring-formed disk 91 with a boss 92. This disk 91 with boss 92 is kept pressed into the direction away from the valve member 84 by a spring 93. A piston 94 may act upon the side of the disk 91 which is directed away from the valve member 84. The piston is displaceable in the valve housing 83 and located in a recess or chamber 95. This chamber 95 is connected with the pipe 79. The valve member 84 is actuated in the direction toward the disk 91 by means of a spring 96. In the part of the valve housing 83 opposite the disk 91 a movable boss 97 is arranged, which is kept pressed in the direction away from the valve member 84 by a spring 98. The boss 97 is provided with a short extension 99 at the end away from valve member 84, whereby a ring-formed chamber 100 is formed which is connected with the pipe 60 via a duct 101.

The device described above functions as follows:

Let it first be assumed that the valve 55 has not received any impulse either for steering braking (through pipe 41) or for driving braking (through pipe 60). The valve member 67 will be in a position shown in FIG. 3. The pipe 59 is then connected with both pipes 41 and 60. These pipes, when no impulses are transmitted through them via the valves 38 and 61, respectively, are connected with the outlet side of the hydraulic system. The pipe 59 is also connected to said outlet side, and the hydraulic unit 44 is not actuated; that is, the brake 17 is not functioning. In this unactuated position, the driving brake pedal 62 and the link 78 with the piston 81 are displaced toward the left in FIG. 5 by the spring 82. The cylinder in which spring 82 is located is then connected, through pipe 80, with oil at normal pressure, and consequently, neither the pipe 79 nor the chamber 95 is under pressure. The piston 94, under the influence of the spring 92 and the disk 91, occupies the position shown in FIG. 6, and the valve member 84, under the influence of the spring 96, is displaced as shown in FIG. 6. The chamber 89 is connected with the chamber 88, and the pipe 60 thereby has an open connection with the pipe 64 which leads to the outlet side of the hydraulic system. Hence, as previously mentioned, there is no pressure in the pipe 60.

Figure 7:
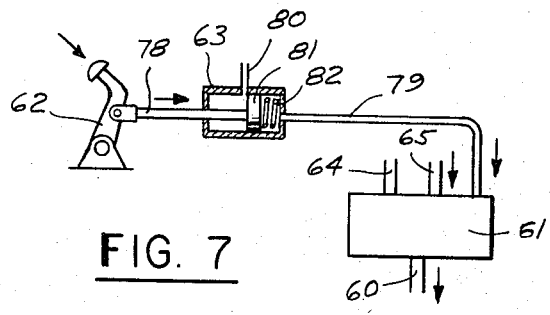
FIG. 7 is similar to FIG. 5, but the actuation of the driving brake pedal is shown in the figure.

If the driving brake pedal 62 is actuated as shown in FIG. 7, the piston 81, by the cooperation of link 78, is pressed against spring 82, and pipe 80 will thereby be closed. The oil in the chamber around the spring 82 is pressed through the pipe 79 into the chamber 95. The piston 94 is now pressed into the direction toward the valve member 84, and, due to the cooperation of the disk 91 and the boss 92, displaces the valve member 84 into the direction away from the chamber 95 and thus occupies the position shown in FIG. 8. Due to this displacement of the valve member 84, the chamber 90 is connected with the chamber 89, and the pipe 60 now receives oil under pressure from the pressure side of the hydraulic system via the pipe 65. The pressure thus built up in the pipe 60 will then be propagated via the pipe 101 to the chamber 100, and will thereby displace the boss 97 into the direction toward the valve member 84. As soon as a pressure corresponding to the pressure in the chamber 95 is built up in the pipe 60 and, accordingly, also in the chamber 100, the valve member 84, under the influence of the guide boss 97, is displaced into the direction toward the chamber 95, and the connection between the chambers 90 and 89 is thereby broken. Accordingly, a pressure corresponding to the depression of the driving brake pedal 62 is built up in the pipe 60.

As shown in FIG. 4, this pressure in the pipe 60 displaces the valve member 67 in the valve 55 in such a way that the chambers 77 and 76 are connected with each other, whereby the pressure from the pipe 60 is propagated to the pipe 59 and actuates the hydraulic unit 44 so that a desired driving braking function of the brake 17 is obtained. Due to the structure of the valve 61 as shown, the driver, when depressing the driving brake pedal 62, encounters a counter pressure in the brake pedal, which facilitates correct braking. Moreover, the valve 61 makes it possible, with comparatively little actuation of the brake pedal 62, to obtain a very heavy driving braking effect.

In the foregoing, only the construction and functioning of the valve 55 are described, but the valve 56 has the corresponding construction, and a pressure impulse through the pipe 60 will be propagated via the pipe 60A to the valve 56 and from there via the pipe 58 to the hydraulic unit 46, which then, in the manner desired, will influence the brake 16.

A pressure impulse transmitted from the control unit valve 38 (which is designed as fully described in patent application Ser. No. 484,248 filed Sept. 1, 1965) when operated for steering of the vehicle is propagated through either of the pipes 40 or 42 (depending upon whether a turn toward the right or the left is intended) and displaces the valve member located in one of the valves 56 or 57, respectively, in the direction opposite to the displacement which an actuation of the driving brake pedal 62 would have given. If this steering impulse is applied to the valve 55, the chamber 75 will become connected with the chamber 76 and thereby the pipe 59 with the pipe 41, and the pressure impulse transmitted through the pipe 41 will thereby be propagated to the hydraulic unit 44, which in turn will actuate the brake 17 for steering. The corresponding situation will, of course, apply to a pressure impulse fed via the pipe 42 to the valve 56.

While the invention has been described in detail with respect to a certain now preferred example and embodiment thereof, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A device for controlling the braking of a moving track-laying vehicle having two tracks and the steering of the vehicle, said device comprising in combination:
   a brake for each track;
   a hydraulic servo means for each brake to actuate the same by operation of the respective servo means;
   a supply conduit for supplying hydraulic pressure fluid to the device;
   first valve means common to both servo means and connected to said supply conduit for feeding pressure fluid to the valve means and discharging the same therefrom, said valve means including spring means biasing the same into a neutral position in which flow of pressure fluid through the valve means is blocked;

second valve means, one for each of the servo means and connected thereto;

first feed conduits connectinng the first valve means to each of the second valve means;

driving braking control means coacting with the first valve means for moving the same against the action of the spring means thereof from the neutral position into an active position in which the first valve means is open for the flow of pressure fluid into said feed conduits, the flow of fluid through the feed conduits into the second valve means causing both said valve means to move from a neutral position into an active position in which both second valve means are open for the flow of fluid to the servo means, thereby simultaneously activating both brakes;

third valve means communicating with said pressure fluid supply conduits and biased into a neutral position blocking the flow of pressure fluid through the third valve means;

second feed conduits connecting said third valve means with each of said second valve means; and steering braking control means coacting with said third valve means for moving the same from the neutral position into a position open for flow of fluid through a selected one of said second feed conduits to the respective second valve means, such flow of pressure fluid to the respective second valve means moving said valve means from its neutral position into the active position in which the respective second valve means is open for a flow of fluid therethrough to the respective servo means to operate the brake associated therewith.

2. A device according to claim 1 wherein each of said second valve means comprises a valve housing and a valve member displaceable in said valve housing, the housing defining three chambers surrounding said valve member, the middle one of said chambers being connected with the respective servo means, one of the outer chambers being connected to the first feed conduits and the other outer chamber to the second feed conduits, the valve member being movable between positions connecting the middle chamber to either of the outer chambers, the position of the valve member in the housing being controlled by the pressure differential between the two feed conduits which in turn is controlled by the positions of the first valve means and the third valve means, respectively.

3. The device according to claim 1 wherein said driving braking control means comprise a brake pedal, a cylinder-piston unit, a linkage connecting a pedal to the piston for displacing the piston in the cylinder, said cylinder being in communication with said pressure fluid supply conduit and also with said first valve means for controlling the position of the latter, operation of said brake pedal causing movement of the first valve means from its neutral position into its active position by the flow of fluid from the cylinder to the first valve means.

References Cited

UNITED STATES PATENTS

| | | | |
|---|---|---|---|
| 1,486,939 | 3/1924 | Winter | 303—13 |
| 2,712,370 | 7/1955 | Westfall | 180—6.2 X |

BENJAMIN HERSH, *Primary Examiner.*

J. A. PEKAR, *Assistant Examiner.*